UNITED STATES PATENT OFFICE.

JOHN ROUX, OF NEW YORK, N. Y.

IMPROVEMENT IN THE MANUFACTURE OF SICCATIVE OILS.

Specification forming part of Letters Patent No. 26,929, dated January 24, 1860.

*To all whom it may concern:*

Be it known that I, JOHN ROUX, of the city of New York, in the county and State of New York, have invented a new and improved method of manufacturing from common fish and whale oils an oil possessing all the drying qualities of the vegetable oils now used by painters in the prosecution of their business, and more valuable and of a much better quality than any of said vegetable oils, and which oil, so manufactured by my new and improved method, can be thereby manufactured and produced at a much less cost than any of said vegetable oils now in use; and I do hereby declare that the following is a full and exact description of my said process or manufacture.

I take one ounce of nut-galls or eight ounces of powdered oak-bark and boil it two hours in four pounds of water. I then filter the solution so made, and, adding one gallon of common fish or whale oil, boil the whole for one hour. After the compound has cooled I separate the oil from the water and the solid matter formed during the boiling and put into the oil a solution of sulphate of copper. The solution of sulphate of copper should be made with two ounces of sulphate of copper to three pounds of water. After boiling this mixture of oil and sulphate of copper for one hour, stirring it while boiling, I precipitate the metallic salts contained in it by adding to the mixture a pint of tannin. The tannin which I use for this purpose is made by boiling one ounce of nut galls or eight ounces of powdered oak-bark for two hours in four pounds of water and filtering it after boiling. I then separate the clear oil from the impurities in the ordinary way. I then add to the clear oil one per cent. of volatile oil of turpentine and one per cent. of linseed-oil to neutralize the smell and to clarify the oil. After stirring this last mixture well I filter it with charcoal, and the result is a pure drying-oil superior to the ordinary vegetable or linseed oil for all painting purposes and for all purposes requiring an oil of similar properties.

The several quantities prescribed in the above specification are those which should be used for one gallon of common fish or whale oil, and in like proportion for greater or less quantities.

What I claim as my invention, and desire to secure by Letters Patent, is—

The above-described art, mode, method, or chemical process by means of which I can give to common fish or whale oil the drying and other qualities now only found in vegetable oils, and which have heretofore rendered them preferable and of superior value for painting and other similar uses.

JOHN ROUX.

In presence of—
    FRANK J. WHITE,
    JAMES A. CRAMSEY.